(12) United States Patent
Curren (10) Patent No.: US 9,177,126 B2
(45) Date of Patent: Nov. 3, 2015

(54) SYSTEM AND METHOD FOR HUMAN IDENTITY VALIDATION VIA A MOBILE DEVICE

(71) Applicant: Edward Curren, Woodbridge, VA (US)

(72) Inventor: Edward Curren, Woodbridge, VA (US)

( * ) Notice: Subject to any disclaimer, the term of this patent is extended or adjusted under 35 U.S.C. 154(b) by 0 days.

(21) Appl. No.: 13/662,424

(22) Filed: Oct. 27, 2012

(65) Prior Publication Data

US 2014/0123256 A1 May 1, 2014

(51) Int. Cl.
*G06F 21/00* (2013.01)
*H04L 9/32* (2006.01)
*G06F 7/04* (2006.01)
*G06F 21/31* (2013.01)
*H04L 29/06* (2006.01)

(52) U.S. Cl.
CPC ........ *G06F 21/31* (2013.01); *G06F 2221/2103* (2013.01); *H04L 63/08* (2013.01); *H04L 63/083* (2013.01)

(58) Field of Classification Search
CPC ...... H04L 63/08; H04L 63/0836; G06F 21/31
USPC ...................................... 713/168, 182; 726/5
See application file for complete search history.

(56) References Cited

U.S. PATENT DOCUMENTS

| | | | |
|---|---|---|---|
| 7,039,951 B1* | 5/2006 | Chaudhari et al. | 726/7 |
| 8,195,576 B1* | 6/2012 | Grigg et al. | 705/67 |
| 2006/0147043 A1* | 7/2006 | Mann et al. | 380/270 |
| 2008/0130902 A1* | 6/2008 | Foo Kune et al. | 380/286 |
| 2012/0072979 A1* | 3/2012 | Cha et al. | 726/7 |
| 2012/0144461 A1* | 6/2012 | Rathbun | H04L 9/3213 726/5 |

* cited by examiner

*Primary Examiner* — Aravind Moorthy
(74) *Attorney, Agent, or Firm* — White-Welker & Welker, LLC; Matthew T. Welker, Esq.

(57) ABSTRACT

Method for establishing and maintaining a person's identity starts at the time the person registers with the system using a mobile device to validate the identity of a person in an inherently anonymous computing environment such as the internet or any other distributed network where face to face communication is not possible. The person will provide information required to establish the person's identity with an authenticator. The authenticator then submits that information to the system administration service to be validated by external databases and services. The external service provides a set of challenge/response questions unique to that person to establish positive identification. Upon successful authentication of the person's identity, the person and their device will be associated with each other and recorded in the system. Each authentication service will define a criterion, labeled as a schema, by which authentication events will be governed.

14 Claims, 6 Drawing Sheets

SYSTEM AND METHOD FOR HUMAN IDENTITY VALIDATION VIA A MOBILE DEVICE

CROSS REFERENCE TO RELATED APPLICATIONS

This application claims priority from U.S. patent application Ser. No. 61/553,156, entitled "Server/Client User Identification System", filed on 29 Oct. 2011. The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to user identification in hardware and software systems. More specifically, the present invention relates to a unified user identity platform for computer systems and software.

BACKGROUND OF THE INVENTION

The proliferation of e-commerce and the simplification of Web site-creation technology have facilitated the escalation of identity theft, a crime that now affects millions of Americans and saps billions of dollars from U.S. businesses annually. Identity theft can affect a business's hard-won reputation and result in expensive litigation.

An effective authentication system is necessary for compliance with requirements to safeguard customer information, to reduce fraud, to inhibit identity theft, and to promote the legal enforceability of their electronic agreements and transactions. The risks of doing business with unauthorized or incorrectly identified persons in an online environment can result in financial loss and reputation damage through fraud, disclosure of customer information, corruption of data, or unenforceable agreements.

Positive authentication of a person's identity in a disconnected environment such as the internet is extremely difficult. Identity theft has been a common problem for several years and has been increasing.

In October 2005, the Federal Financial Institutions Examination Council agencies issued guidance entitled 'Authentication in an Internet Banking Environment'. Since the issuance of the guidance, Internet-based fraud incidents have increased, particularly with respect to commercial accounts and the use of automated payment mechanisms (e.g., wire transfers and automated clearinghouse payments). The agencies are issuing the attached supplement to the guidance to reinforce the guidance's risk management framework and to update their expectations regarding customer authentication, layered security, and other controls in the increasingly hostile online environment.

Current available solutions all suffer from the same problem. While communication channels are secured, the actual identity of the person conducting the transaction is not known. Moreover, stronger authentication mechanisms such as one time password generators are too expensive for an organization with a large number of members to distribute and maintain.

Electronic agreements and online signature of documents are particularly venerable and potentially have larger consequences if a signature is fraudulent. With the increasing popularity and implementation of such signatures, an effective solution which positively confirms the identity of the signer is crucial.

SUMMARY OF THE INVENTION

The invention provides a mechanism to establish and maintain positive identity of a person in an inherently anonymous computing environment such as the internet or any other distributed network where face to face communication is not possible.

Authentication of the person's identity to the computing environment is accomplished via a person's mobile device. During an authentication event, the person will be required to provide a set of information to the device, which only that person knows. Examples of this information may include such things as a password or selection of one or more correct items from a list. The presentation and type of information required of the person is configured by an authenticator and communicated to a person's device via an authentication schema.

Authentication is used for or required by many purposes. Examples of some of these purposes include logging into a computer system, digital signatures of electronic documents or voting.

DEFINITIONS

An "application" is a consumer of the authentication service's identity validation service.

An "authenticator" is an employer of an authentication service. Examples of an authenticator may include banks, electronic agreement or electronic document signing services, secure web sites or home network owners.

An "authentication event" is a request for a person's identity to be validated by the authentication service.

An "authentication schema" is a set of criterion and attributes by which an authentication service defines authentication methods and requirements, communication channels, attributes and other metadata required to prosecute an authentication event.

An "authentication service" provides the functionality to process information provided by person via the person's device during an authentication event to validate a person's identity. This validation is subsequently provided to and used by an application.

A "device" is a mobile device which belongs to a specific person and acts as the proxy between the person and the authentication service. Examples of a device include a person's cell phone, tablet computer or PDA.

A "system management service" primarily provides the system with oversight and monitoring of suspicious authentication events, system notification of compromised entities within the system and is responsible for establishing a person's identity with high confidence.

BRIEF DESCRIPTION OF THE DRAWINGS

The accompanying drawings, which are incorporated herein and form a part of the specification, illustrate the present invention and, together with the description, further

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

In the same way that a passport is used as identification and as a device to cross security boundaries of nations in the physical world, the present invention enables a mobile device to be used as a means of identification to cross security boundaries in the computer world.

The present invention provides a platform on which multiple methods of authentication are available to integrate with virtually any sort of software, computer system, network, or cloud computing environment. This unified user identity platform also enables customers to use the present invention as the foundation to customize their own solution to authentication problems within their organization.

The present invention provides a mechanism to validate the identity of a person in an inherently anonymous computing environment such as the internet or any other distributed network where face to face communication is not possible.

The process of establishing and maintaining a person's identity starts at the time the person registers with the system. The person will provide information required to establish the person's identity with an authenticator. The authenticator then submits that information to the system administration service to be validated by external databases and services. The external service provides a set of challenge/response questions unique to that person to establish positive identification. Upon successful authentication of the person's identity, the person and their device will be associated with each other and recorded in the system.

Each authentication service will define a criterion, labeled as a schema, by which authentication events will be governed. When a person successfully registers with the system, the authentication service will provide a copy of its schema to the person's device. During subsequent authentication events, a person will be required to authenticate their identity again according to the authentication service's schema before access to an application is allowed.

Should an authenticator wish to employ a different method of identity authentication, such as in person registration, they may register a person accordingly, however this registration will be labeled as not having originated via the system management service's identity prosecution and may have limited rights within the system.

Authentication events may be initiated by either an application or a person.

Ongoing system integrity is supported by the system management service, which provides three key functions.

First among these services is system wide notification of compromised components. Typically a compromised component within the system will be when a device is lost or stolen, or an authentication service's security has been breached.

Next among these services are frequent queries with external databases for identity theft of registered identities. This function seeks to proactively find notification of identity theft or fraud in order to sustain system integrity.

Finally, the system management service continuously looks for suspicious activity among the components of the system based on an updateable set of rules in order to identify and prevent fraudulent activity, which may compromise system integrity.

In order for a person to authenticate their identity to the system, they must first register with an authentication service. There are two registration processes supported by the system.

The primary registration scenario starts with a person providing the information required to validate their identity with an authenticator. The person's device then contacts the authentication service, at which time the authentication service will provide the device with a copy of the authentication service's authentication schema. Next the authentication service contacts the system management service to request a verification and validation of the person's identity. The authentication service provides the identity information provided by the person earlier in the process. The system management service then does an initial check of the identity information to assure the information is valid by referencing the external identity database service. Assuming the identity information is valid, the system management server will request the external identity validation service to send a series of questions to the person's device to which only the person would know the answer. The responses are sent back to the identity validation service for processing and scoring. The system management service then analysis the score in accordance with a configurable rules engine within the system management service to determine if the identity is authentic or fraudulent.

As an alternate method of registration, the authenticator may implement a custom means of authentication. For example an authenticator may decide to validate a person's identity in person.

The authentication process begins with an initiation of an authentication event. The authentication event may be initiated by either the application using the authentication service or by the person via the person's device. Once the authentication event is initiated, the person must authenticate himself or herself to the device in accordance with the authentication service's authentication schema. The information provided by the person to the authentication schema is processed to determine the authenticity of the person's identity.

The application is notified of the result of the authentication event. If the person's identity is not confirmed as being authentic, the process will refer to the authentication schema to determine if subsequent authentication attempts are allowed and if any further examination of the person's identity needs to be made.

When a device or authentication service is reported as compromised, the system management service will send such notification to all affected devices and authentication service instances. Affected components will subsequently 'blacklist' those components in order to preserve the integrity of the overall system and prevent fraudulent identity authentications.

Figure 1:
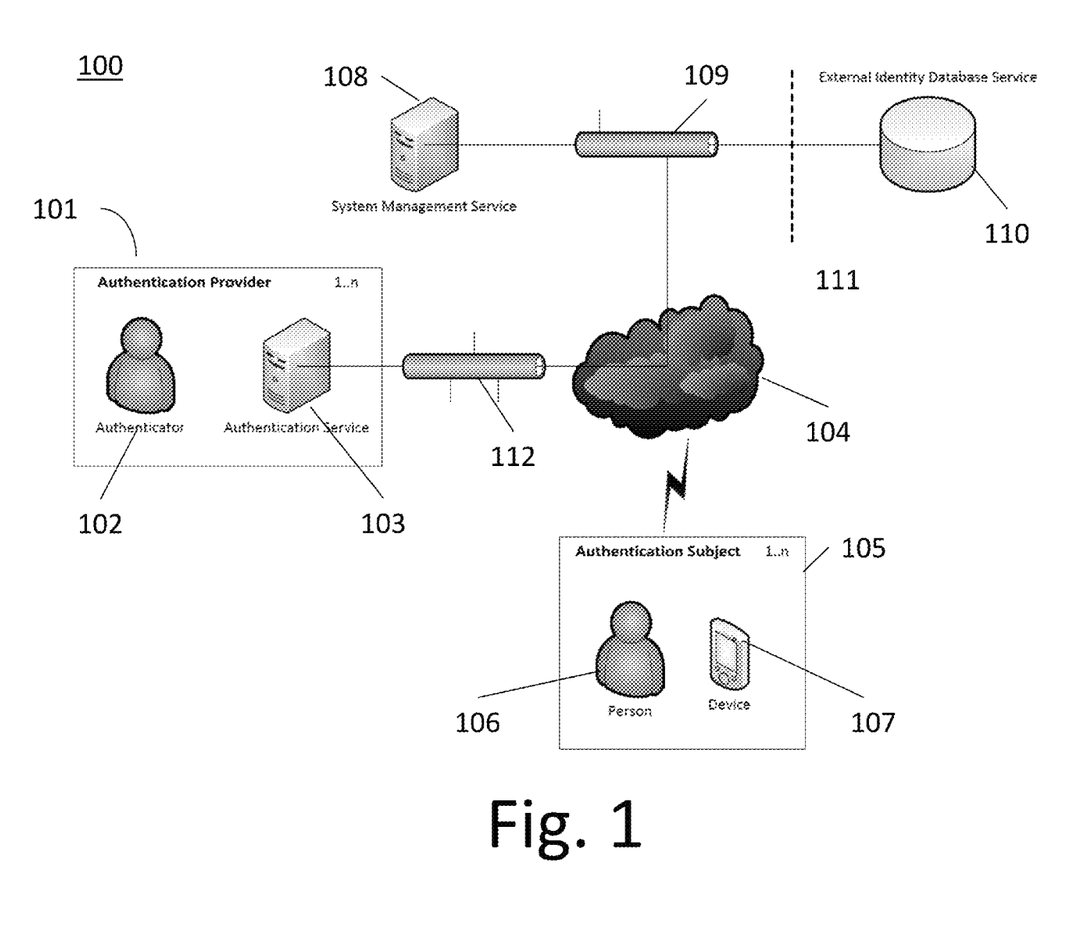
FIG. 1 illustrates the system overview of the present invention.

Now referring to the Figures, the embodiment of the present invention is illustrated. FIG. 1 illustrates the system overview 100 of the present invention. An authentication provider 101 is comprised of an authenticator 102 and authenticator service 103 running on a computer connected to the internet 104 via an internet connection 112. An authentication subject 105 is comprised of a person 106 and a device, such as a cell phone or other mobile computing device 107 also connected to the internet 104. A system management service 108 running on a computer is connected to the internet 105 by an internet connection 109. An external identity database service 110 located behind a firewall 111 is also connected to the internet 104 by an internet connection 109.

Figure 2:
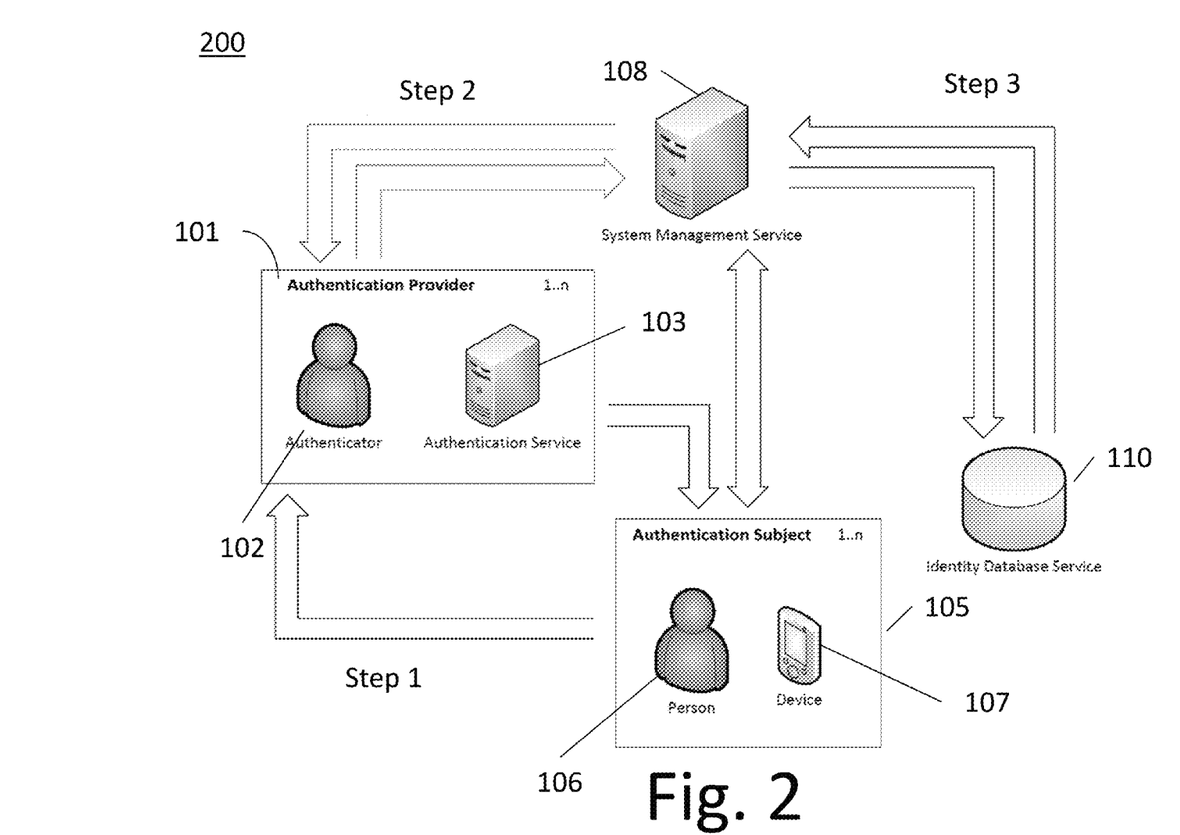
FIG. 2 illustrates the automated personal registration process of the present invention.

FIG. 2 illustrates the automated personal registration process 200 of the present invention. The registration process starts with a person 106 registering with an authentication service provider 101 in Step 1. The authentication provider 101 will collect the information about the person 106 in order to verify the identity of the person 106. In step 2, the authentication service 103 submits an identity validation request to the system management server 108. The system management server 108 will check its own data for the existence of this person 106 and update existing data if the identity exists. In step 3, the system management server 108 validates the identity of the person 106 with calls to an external identity database service 110. The external identity database service 110 will interactively determine the validity of the identity of the person 106.

Figure 3:
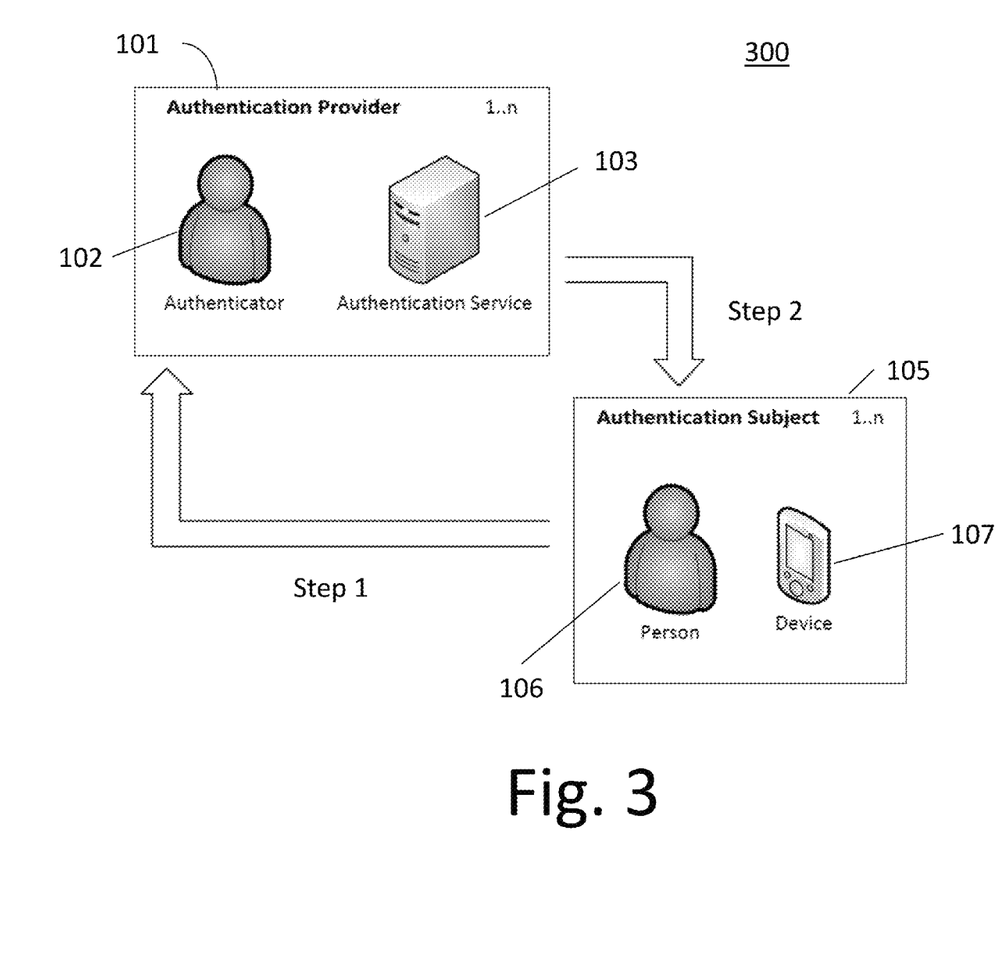
FIG. 3 illustrates the authenticator validated person registration process of the present invention.

FIG. 3 illustrates the authenticator validated person registration process 300 of the present invention. In Step 1, the registration process starts with a person 106 registering with an authentication provider 103. The authentication provider 103 will collect the information about the person 106 in order to verify the identity of the person 106. The authenticator 102 takes whatever due diligence meets the need of the authenticator 102 to validate the identity of the person 106 before registering the person in the authentication service's database 110 in step 2.

Figure 4:
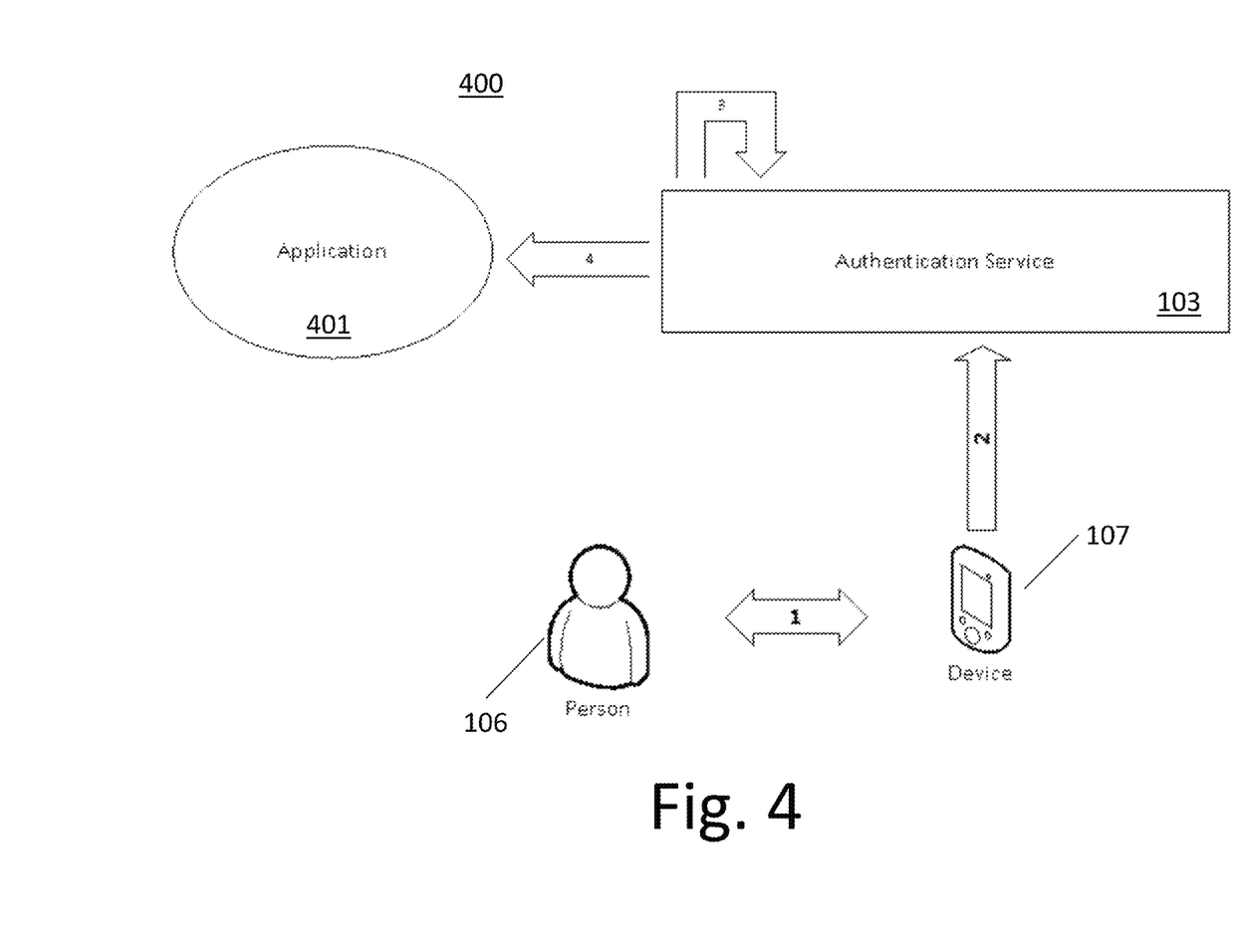
FIG. 4 illustrates the person initiated authentication process of the present invention.

FIG. 4 illustrates the person initiated authentication process 400 of the present invention. In a first step 1, the device 107 presents an authentication service 103 designed authentication interface in which the person 106 enters information to prove the person's identity. In a second step 2, the device 107 sends the authentication credentials to the authentication service 103 as well as a request to the authentication service 103. In a third step 3, the authentication service 103 analyses the credentials from the device 107 against known person information to make a determination of validity of the identity of the person 106. Finally, in a fourth step 4, the authentication is passed to an application 401.

Figure 5:
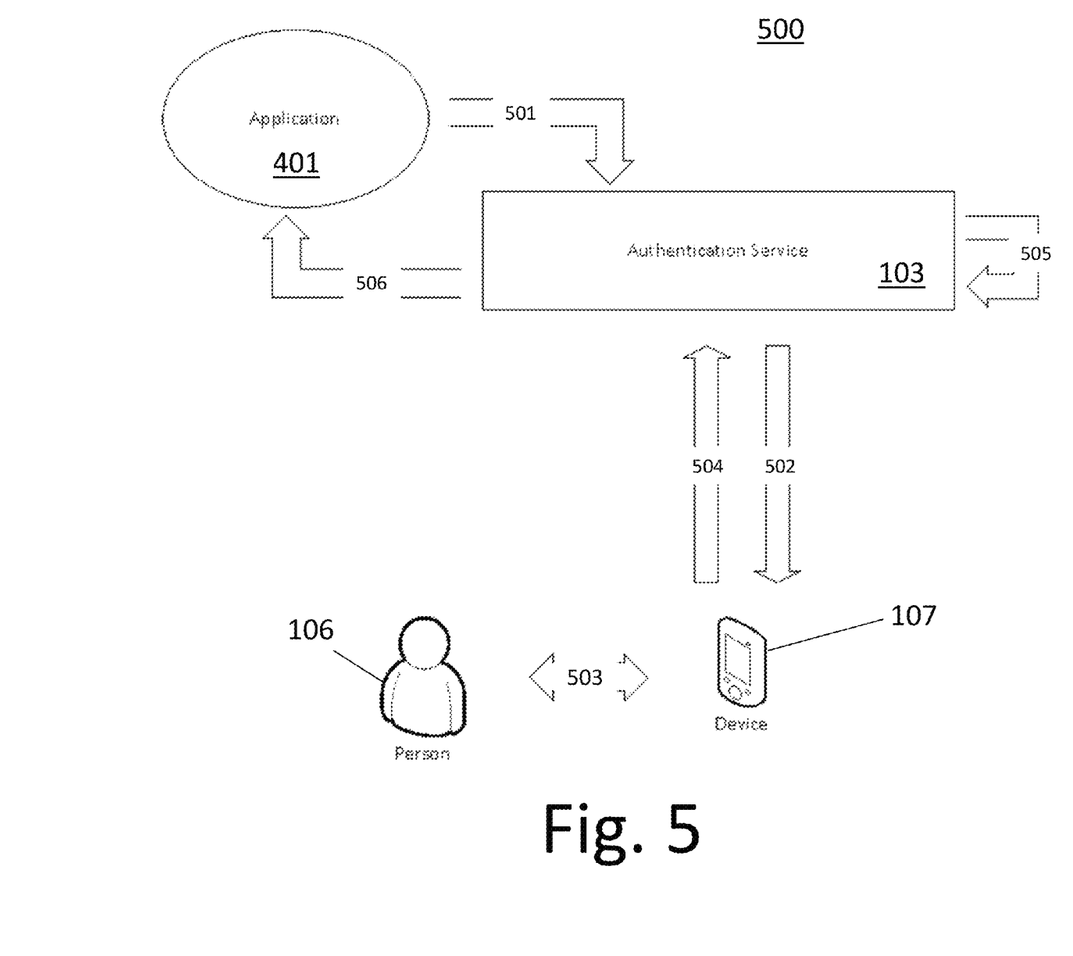
FIG. 5 illustrates the application initiated authentication process of the present invention.

FIG. 5 illustrates the application initiated authentication process 500 of the present invention. In a first step 501, the application 401 initiates a request for authentication of a person's identity. In a second step 502, the authentication service 103 sends an authentication request to a person's device 107. In a third step 503, the device 107 presents an authentication service designed authentication interface in which the person 106 enters information to prove the person's identity. In a fourth step 504, the person's responses are returned to the Authentication Service 103 for analysis. In a fifth step 505, the authentication service 103 analyses the information returned against known person information to make a determination of validity of the identity of the person 106. In a sixth and final step 506, the results of the authentication are returned to the application 401.

Figure 6:
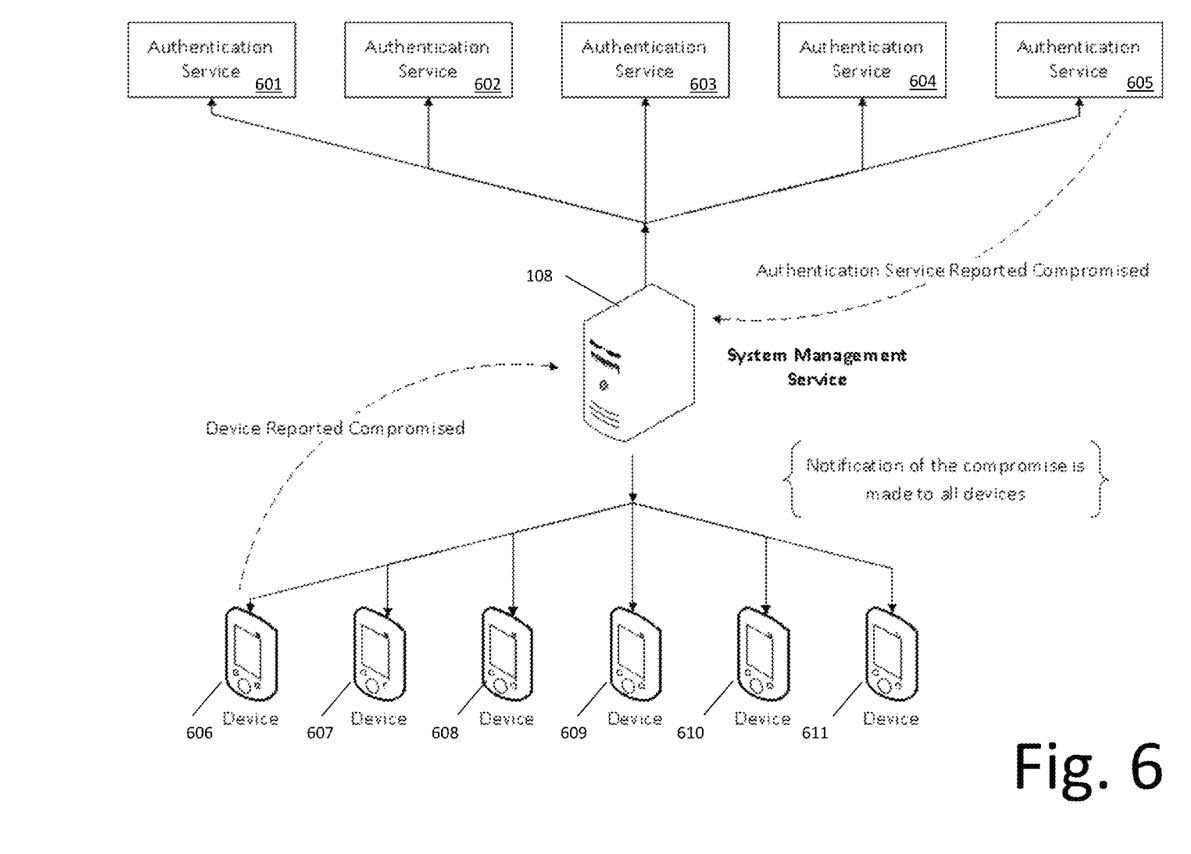
FIG. 6 illustrates the compromised system component alert of the present invention.

FIG. 6 illustrates the compromised system component alert of the present invention. When either a device or an authentication service is reported as compromised, all devices 606-611 and authentication services 601-605 are notified by the system management service 108. If a compromised device attempts to authentication against an authentication service, the authentication event will be terminated. If a device is registered with a compromised authentication service, the device will disable access to that authentication service.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property of privilege is claimed are defined as follows:

1. A method for identification comprising the steps of:
   providing an application that is installed on a device for execution;
   the application also serves as a platform for customers to build customized applications to suit specific needs;
   providing an authentication service software executable on any hardware platform;
   registering a person with the application;
   collecting information required to establish the person's identity with an authenticator;
   an external service provides a set of challenge / response questions unique to that person to establish positive identification;
   upon successful authentication of the person and their device will be associated with each other and recorded in the system;
   initiating primary registration with a person providing the information required to validate their identity with an authenticator;
   contacting, by the person's device, the authentication service, at which time the
   providing, by the authentication service, the device with a copy of the authentication service's authentication schema;
   contacting, by the authentication service, the system management service to request a verification and validation of the person's identity;

providing, by the authentication service, the identity information provided by the person earlier in the process;
running an initial check of the identity information to assure the information is valid by sending a request to the external identity database service by the system management service;
assuming the identity information is valid;
requesting the identity validation service to send a series of questions to the person's device to which only the person would know the answer by the system management server;
sending the responses back to the identity validation service for processing and scoring; and
analyzing the score in accordance with a configurable rules engine within the system management service to determine if the identity is authentic or fraudulent by the system management service.

2. The method of claim 1, wherein the authentication service is software executable on a computer which resides in a customer's secured computing environment.

3. The method of claim 1, wherein the hardware platform is from the group consisting of computers, mobile devices, network devices, routers, firewalls, consumer electronics, cars, airplanes, avionics, controlled physical area access hardware, appliances, and specially constructed hardware applications.

4. The method of claim 1, further comprising the steps of:
defining, each authentication service, a criterion, labeled as a schema, by which authentication events will be governed;
providing by the authentication service a copy of its schema to the person's device upon registration with the authentication service; and
requiring a subsequent authentication of an identity again according to the authentication service's schema before access to an application is allowed during subsequent authentication events.

5. The method of claim 4, wherein
authentication events are initiated by either an application or a person; and
labeling this registration as not having originated via the system management service's identity prosecution and are limited rights within the system should an authenticator wish to employ a different method of identity authentication, they register a person accordingly.

6. The method of claim 4, wherein
providing ongoing system integrity is supported by the system management service;
generating system wide notification of compromised components;
generating frequent queries with external databases for identity theft of registered identities; and
continuously looking for suspicious activity among the components of the system based on an updateable set of rules in order to identify and prevent fraudulent activity which compromise system integrity by the system management service.

7. The method of claim 1 embedded into a consumer hardware device.

8. The method of claim 1, further comprising the steps of implementing a custom means of authentication;
beginning the authentication process with an initiation of an authentication event;
initiating the authentication event by either the application using the authentication service or by the person via the person's device;
authenticating the device in accordance with the authentication service's authentication schema;
processing the information provided by the person to the authentication schema;
determining the authenticity of the person's identity;
notifying the application of the result of the authentication event; and
referring to the authentication schema to determine if subsequent authentication attempts are allowed and if any further examination of the person's identity needs to be made if the person's identity is not confirmed as being authentic.

9. The method of claim 1, further comprising the steps of when a device or authentication service is reported to be compromised, the system management service will; and
sending a notification to all affected devices and authentication service;
blacklisting those components in order to preserve the integrity of the overall system and prevent fraudulent identity authentications.

10. A method for using a mobile device to validate the identity of a person in an inherently anonymous computing environment or any other distributed network where face to face communication is not possible, comprising the steps of:
establishing a person's identity starts at the time the person registers with the system;
collecting information required to establish the person's identity with an authenticator;
submitting collected information to an authenticator;
transmitting collected information to a system administration service;
validating the collected information by external databases and services;
maintaining a person's identity;
sending an authentication request to an authenticator;
forwarding an authorization request to the external service by the authenticator;
providing a set of challenge/response questions unique to that person to establish positive identification by the external service;
making an authentication determination;
upon successful authentication of the person's identity, the person and their device will be associated with each other and recorded in the system;
initiating primary registration with a person providing the information required to validate their identity with an authenticator;
contacting, by the person's device, the authentication service, at which time the
providing, by the authentication service, the device with a copy of the authentication service's authentication schema;
contacting, by the authentication service, the system management service to request a verification and validation of the person's identity;
providing, by the authentication service, the identity information provided by the person earlier in the process;
running an initial check of the identity information to assure the information is valid by sending a request to the external identity database service by the system management service;
assuming the identity information is valid;
requesting the identity validation service to send a series of questions to the person's device to which only the person would know the answer by the system management server;
sending the responses back to the identity validation service for processing and scoring; and analyzing the score in accordance with a configurable rules engine within the system management service to determine if the identity is authentic or fraudulent by the system management service.

11. The method of claim 10, further comprising the steps of
defining a criterion, labeled as a schema, by which authentication events will be governed by each authentication service;
registering a person successfully with the system
providing a copy of its schema to the person's device by the authentication service; and
requiring a person will be required to authenticate their identity again according to the authentication service's schema before access to an application is allowed during subsequent authentication events.

12. The method of claim 11, further comprising the steps of
employing a different method of identity authentication by an authenticator;
registering a person accordingly;
labeling this registration as not having originated via the system management service's identity prosecution; and
setting limited rights within the system for any registration not originated via the system management service.

13. The method of claim 11, further comprising the steps of
providing ongoing system integrity by a system management service, which provides three key functions:
  providing a system wide notification of compromised components;
  providing frequent queries with external databases for identity theft of registered identities; and
  continuously looking for suspicious activity among the components of the system based on an updateable set of rules in order to identify and prevent fraudulent activity, which compromise system integrity by the system management service.

14. The method of claim 13, further comprising the steps of
notifying all components and authentication services by the system management service when either a component or an authentication service is reported as compromised;
detecting an attempt to authenticate against an authentication service by a compromised component;
terminating the authentication event; and
disabling access to that authentication service, if the component is registered with a compromised authentication service.

* * * * *